Sept. 11, 1934.     J. W. ANDERSON     1,973,366
WINDSHIELD WIPER

Filed Nov. 26, 1930

Witness:
William P. Kilroy

Inventor:
John W. Anderson
Hill & Hill

Patented Sept. 11, 1934

1,973,366

UNITED STATES PATENT OFFICE 1,973,366

WINDSHIELD WIPER

John W. Anderson, Gary, Ind.

Application November 26, 1930, Serial No. 498,343

9 Claims. (Cl. 15—250)

This invention relates to windshield wipers, and particularly to means for connecting the wiper blade to the arm by which the blade is moved across the surface of the windshield.

One object of the present invention is to provide a wiper blade connector having construction and arrangement wherein the wiper blade is hingedly mounted with respect to the wiper arm and movable with respect to an operating shaft in a manner to oscillate about a plurality of substantially parallel center lines spaced apart from each other.

Another object of the invention is to provide a connector for connecting a wiper blade to its operating shaft, and having means associated with the connector for urging the wiper blade and parts of the connector into substantial alignment and toward a perpendicular position with respect to the surface of the windshield.

Another object of the invention is to provide a wiper blade connector having means associated therewith for assisting in changing the angularity of the wiper blade with respect to the surface of the windshield at each end of the wiping stroke in a manner to eliminate chattering when the direction of movement of the blade is reversed.

Another object of the invention is to provide a wiper blade connector having resilient means associated therewith for cushioning the relative movement of the wiper blade and parts of the connector, thereby avoiding a loose uncontrolled flopping action of the wiper blade at the ends of its stroke and when the direction of movement of the blade is reversed.

Another object of the invention is to provide a wiper blade connector having means associated therewith for urging the wiper blade toward an intermediate or normal position when the wiper is at rest, thereby avoiding the lateral bending strain on the wiping element during its period of non-use.

A further object of the invention is to provide a wiper blade connector having resilient means associated therewith to produce a rocking reflex action of the wiper blade at each end of its wiping stroke, thereby providing a quiet smoothly operating device.

A still further object of the present invention is to improve devices of the character described in sundry details hereinafter referred to and particularly pointed out in the appended claims.

One embodiment of the present invention is shown for illustrative purposes in the accompanying drawing in which Fig. 1 is an elevational view of the windshield wiper blade and supporting arm assembly, showing its application to the windshield of a motor vehicle, or the like, and illustrating an embodiment of the present invention associated therewith;

Figure 1:
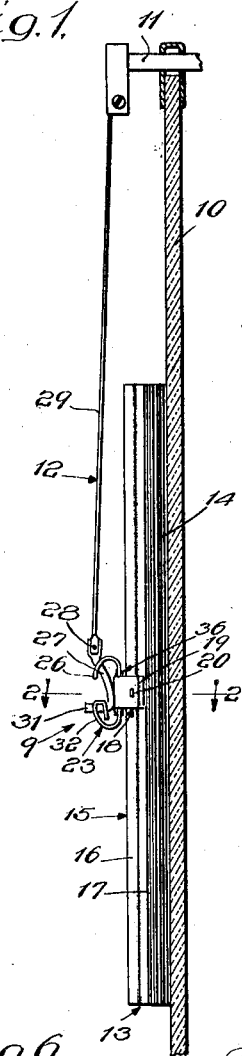

In the drawing, the wiper blade and arm assembly is indicated as a whole by the reference character 9, and shown in its operative position with respect to a windshield 10 of a motor vehicle, or the like, at the top of which is mounted a wiper blade operating rock shaft 11 to which is connected a supporting or operating wiper arm designated as a whole by the numeral 12, in a manner to position a wiper blade 13, including a flexible wiping element 14 of rubber or other suitable material, in cooperative relationship with the surface of the windshield. The rock shaft 11 may be connected to any suitable operating device, (not shown), for oscillating the shaft, and in a manner to move the wiper blade across the surface of the windshield.

In the illustrative embodiment of the present invention, the wiping element 14 is mounted in a holder 15 formed preferably of metal or other suitable material folded, in the present instance, to form a bead portion 16 and a channel or groove, between the legs or wall portion 17 of which the wiping element 14 is secured.

For connecting the wiper blade 13 to the arm 12 and operating shaft 11, a U-shaped clip designated as a whole by the numeral 18 is provided with leg portions 19 adapted to engage opposite sides of the holder 15 in a manner to be secured thereto by means of a bolt or cotter pin 20 extending through apertures formed in the bead portion 16 and the legs 19 of the clip.

The clip 18 is also provided with a bight portion 21 of substantial width spaced from the adjacent face of the bead 16, the bight portion 21 being adapted to receive the intermediate or body portion 22 of a connecting member or hanger designated as a whole by the numeral 23, the portion 22 being of a width slightly less than the distance between the inner faces of the leg portion 19 of the clip. The clip 19 is shown in the present instance as provided with oppositely disposed extensions 24 forming a continuation of the bight portion, and against which the intermediate portion 22 of the hanger 23 is adapted to engage.

Figures 4, 5:
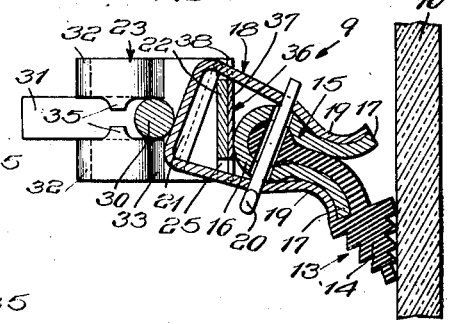
Fig. 4 is a sectional view similar to Fig. 2 showing portions of the device in changed position, and illustrating the action of the device when in operation.
Fig. 5 is an enlarged perspective view of a connecting member or hanger forming one of the elements of the present invention.

It will be observed that by such an arrangement, the clip 18 and blade 13 connected thereto is permitted to oscillate about the portion 22, one edge of the portion 22 cooperating with the juncture of the bight portion 21 and one of the leg portions 19 of the clip 18 to provide a fulcrum or center line of rotation for the clip and blade when the arm is oscillated to move the blade across the windshield in one direction as clearly shown in Fig. 4, and the opposite edge of the portion 22 cooperating with the juncture of the bight portion 21 and the other leg portion 19 of the clip 18 to provide a fulcrum or center line of rotation for the clip and blade when the arm is oscillated to move the blade across the windshield in the opposite direction. Thus, it will be observed that a plurality of spaced hinge connections are provided between the clip and hanger about which the blade may oscillate during its wiping movements across the surface of the windshield.

The hanger 23 is shown in the present instance as provided adjacent the ends of its intermediate portion 22 with shoulders 25 adapted to engage the opposite edges of the leg portions 19 of the clip 18 in a manner to prevent longitudinal displacement of the hanger 23 with respect to the clip.

The hanger 23 is also provided, adjacent its upper end, with bifurcated portions 26 spaced apart from each other and bent outwardly from the plane of the intermediate portion 22 and adapted to receive between their adjacent edges one portion of the wiper arm 12 in a manner to prevent lateral displacement of the hanger 23 with respect to the arm, the said portion of the wiper arm 12 being shown in the present instance as a head 27 secured by means of a bolt 28 to a flexible portion 29 of the arm, the head 27 being bent as indicated at 30 to provide a portion adapted to engage the outer surface of the bight portion 21 formed on the clip 18, and having an outwardly extending hook portion 31 adapted to be positioned between a pair of fingers 32 formed on the lower end of the hanger 23.

Figure 3:
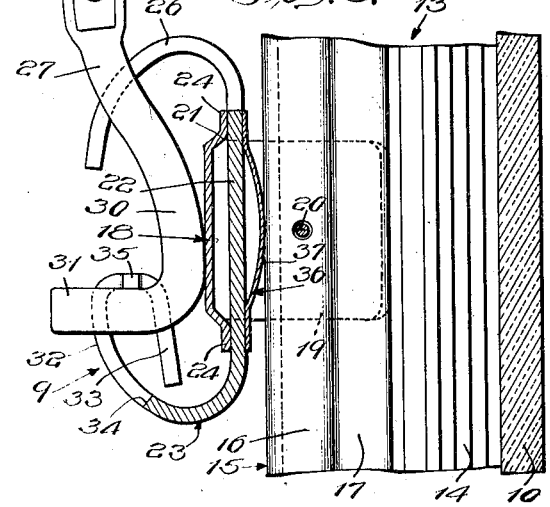
Fig. 3 is a sectional elevation taken substantially as indicated by the line 3—3 of Fig. 2.

As clearly shown in Figs. 3 and 5, the lower end of the body portion 22 of the hanger 23 is bent outwardly from the plane of the portion 22 and provided with the fingers 32 which are bent backwardly upon themselves as indicated at 33 to provide engagement with the portion 31 at points spaced a substantial distance from each other in a manner preferably to secure the hanger 23 against oscillatory movement with respect to the wiper arm 12.

The hanger 23 is provided adjacent the juncture of the fingers 32, with a notch 34 adapted to engage one side of the portion 31 in a manner to limit longitudinal movement of the hanger 23 with respect to the wiper arm in one direction, and the adjacent faces of the fingers 32 are provided preferably adjacent their bight portion with lugs 35 adapted to engage the opposite side of the portion 31 in a manner to limit the longitudinal movement of the hanger with respect to the arm in the opposite direction. The space between adjacent edges of the bifurcated portions 26, and adjacent edges of the fingers 32 is preferably substantially equal to the diameter of the head 27 and its portion 31 so as to provide suitable engagement with the head portion of the wiper arm 12 in a manner to prevent oscillatory and lateral movement of the hanger 23 with respect to the wiper arm 12.

Figure 6:
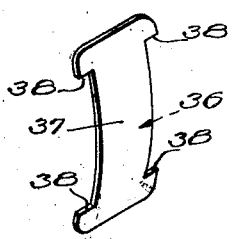
Fig. 6 is a perspective view of a resilient member forming another element of the invention.

Positioned in the space between the portion 22 of the hanger 23 and the adjacent face of the bead 16 of the wiper blade 13 is a resilient member designated as a whole by the numeral 36, and shown, in the present instance, as a flat spring having its intermediate portion 37 normally bent as clearly shown in Figs. 3 and 6, and provided adjacent its end portion with laterally extending lugs or shoulders 38 adapted to engage opposite edges of the leg portions 19 of the clip 18 in a manner to prevent longitudinal displacement of the member 36 with respect to the clip. The member 36 is positioned between the wiper blade and portion 22 of the hanger under tension and in a manner to normally exert a force tending to separate the portion 22 and blade 13 thereby urging the blade and attached clip 18 into substantial transverse alignment with the hanger 23, as clearly shown in Fig. 2, but by reason of its resiliency, the member 36 will yield to permit oscillation of the blade and clip around the respective fulcrums or centers of rotation, above referred to, to permit the wiper blade to assume a suitable angular position with respect to the surface of the windshield during the wiping operation in either direction.

It will be observed from the foregoing description that by reason of the force continually exerted between the portion 22 and bead 16 tending to laterally align the blade, clip and hanger, the spring 36 at each end of the wiping stroke will act to bring about such alignment and thereby assist in changing the angularity of the blade with respect to the surface of the windshield each time the direction of movement of the wiper blade and arm is reversed, thus promoting the prompt turning of the wiping element 14 to bring the proper side or face of the element into contact with the surface of the windshield for its return stroke.

Figure 2:
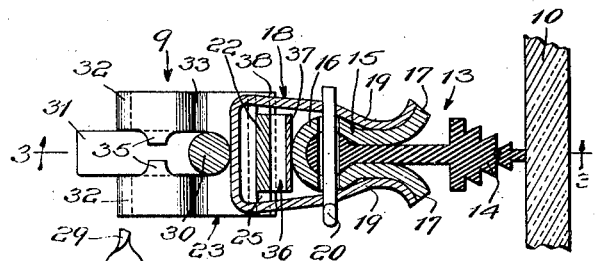
Fig. 2 is an enlarged sectional plan view taken substantially as indicated by the line 2—2 of Fig. 1.

It will be observed also that when the wiper blade is parked, usually at one end of its stroke, the spring 36 serves to urge the blade and clip toward substantial alignment as shown in Fig. 2, thereby relieving the wiping element 14 from the lateral bending strain prevalent in windshield wipers at present in use.

It will be observed further that by reason of the assistance rendered by the member 36 in changing the angularity of the blade with respect to the surface of the windshield at the ends of its stroke, the action of the spring eliminates chattering of the blade when reversing its direction of movement, and also, that in changing its angular position with respect to the surface of the windshield, the movement of the blade is cushioned against the resiliency of the spring, thereby preventing a loose uncontrolled noisy flopping action of the blade as is characteristic of present devices.

Obviously the present invention is not limited to the precise construction and arrangement shown and described as the same may be variously modified within the scope of the claims.

Moreover, all the features of the invention need not be used con-jointly as the same may be used to advantage in variously different combinations and sub-combinations.

Having thus described my invention, what I claim as new and desire to cover by Letters Patent is:

1. In a windshield wiper, the combination with a wiper blade, of means for connecting said blade to a wiper arm, said means comprising a U-shaped clip secured to said blade and having a bight portion spaced therefrom, a hanger having a portion positioned in said bight portion of the clip in a manner to provide a hinge connection between said clip and hanger, said hanger being adapted to be connected to the wiper arm, and means for maintaining said hanger in operative engagement with the bight portion of said clip and for permitting relative rocking movement of the clip and hanger.

2. In a windshield wiper, the combination with a wiper blade, of means for connecting said blade to a wiper arm, said means comprising a U-shaped clip secured to said blade and having a bight portion spaced therefrom, a hanger having a portion loosely positioned in said bight portion of the clip in a manner to provide a hinge connection between said clip and hanger, said hanger being adapted to be connected to the wiper arm, and resilient means for yieldingly maintaining said hanger in operative engagement with the bight portion of said clip and for permitting relative rocking movement of the clip and hanger.

3. In a windshield wiper, the combination with a wiper blade, of means for connecting said blade to a wiper arm, said means comprising a U-shaped clip rigidly secured to said blade and having a bight portion spaced therefrom, a hanger having a portion loosely positioned in said bight portion of the clip in a manner to provide a hinge connection between said clip and hanger, means for retaining said hanger against longitudinal displacement with respect to said clip, said hanger being adapted to be connected to the wiper arm, and means for maintaining said hanger in operative engagement with the bight portion of said clip and for permitting relative rocking movement of the clip and hanger.

4. In a windshield wiper, the combination with a wiper blade, of means for connecting said blade to a wiper arm, said means comprising a U-shaped clip secured to said blade and having a bight portion spaced therefrom, a hanger having a portion positioned in said bight portion of the clip in a manner to provide a hinge connection between said clip and hanger, said hanger being adapted to be connected to the wiper arm, resilient means for yieldingly maintaining said hanger in operative engagement with the bight portion of said clip and for permitting relative rocking movement of the clip and hanger, and means for retaining said hanger and resilient means against longitudinal displacement with respect to said clip.

5. In a windshield wiper, the combination with a wiper blade, of means for connecting said blade to a wiper arm, said means comprising a U-shaped clip rigidly secured to said blade and having a bight portion spaced therefrom, a hanger having a portion positioned in said bight portion of the clip in a manner to provide a hinge connection between said clip and hanger, said hanger being adapted to be connected to the wiper arm, resilient means positioned between said blade and hanger for yieldingly maintaining said hanger in operative engagement with the bight portion of said clip and for permitting relative rocking movement of the clip and hanger, and means formed on said hanger and resilient means and engageable with said clip for maintaining the hanger and resilient means against longitudinal displacement with respect to the clip.

6. In a windshield wiper, the combination with a wiper blade, of means for connecting said blade to a wiper arm having a laterally extending end portion, said means comprising a clip secured to said blade, a hanger having its central part hingedly connected to said clip on an axis parallel to said blade, said hanger having one of its end portions extending laterally with respect to said arm and bifurcated to receive a portion of said arm between the bifurcations and having a plurality of spaced fingers adjacent its opposite end extending laterally therefrom and transversely to the laterally extending end portion of the arm and being adapted to receive said end portion of the arm between said fingers, the notch formed at the juncture of said fingers being adapted to engage said end portion of the arm to limit the movement of said hanger in one direction longitudinally of the arm, and means formed on said fingers for engaging said end portion of the arm to limit the movement of said hanger in the opposite direction longitudinally of the arm.

7. In a windshield wiper, the combination with a wiper blade, of means for connecting said blade to a wiper arm having a laterally extending end portion, said means comprising a clip secured to said blade, a hanger having its central part hingedly connected to said clip on an axis parallel to said blade, said hanger having one of its end portions bifurcated and bent outwardly to receive a portion of said arm between the bifurcations and having a plurality of outwardly and reversely bent spaced fingers adjacent its opposite end adapted to receive the laterally extending end portion of said arm between said fingers, the notch formed at the juncture of said latter fingers being adapted to engage said end portion of the arm to limit the movement of said hanger in one direction longitudinally of the arm, means formed on said latter fingers for engaging said end portion of the arm to limit the movement of said hanger in the opposite direction longitudinally of the arm, and means for normally maintaining said hanger, clip and blade in substantial alignment.

8. In a windshield wiper, the combination with a wiper blade, of means for connecting said blade to a wiper arm having a laterally extending end portion, said means comprising a clip secured to said blade, a hanger having its central part hingedly connected to said clip on an axis parallel to said blade, said hanger having one of its end portions bifurcated and bent outwardly to receive a portion of said arm between the bifurcations and having a plurality of outwardly and reversely bent spaced fingers adjacent its opposite end, said latter fingers being bent upon themselves and adapted to provide a plurality of spaced engagements with said end portion of said arm, the notch formed at the juncture of said latter fingers being adapted to engage said end portion of the arm at one side thereof to limit the movement of said hanger in one direction longitudinally of the arm, means formed on adjacent sides of said fingers for engaging the opposite side of said end portion of the arm to limit the movement of said hanger in the opposite direction longitudinally of the arm, and resilient means operatively related to and cooperable with said hanger and blade for normally maintaining said hanger, clip and blade in substantial alignment.

9. In a windshield wiper, the combination with a resilient wiper blade, of means for connecting said blade to a wiper arm having a hook-like member mounted thereon, said means consisting of a rigid element secured to said blade, a hanger extending substantially parallel to said element and hingedly connected thereto on axes extending substantially parallel thereto, said hanger having means at the side of its body opposite said element adapted to receive adjacent one end of the hanger a portion of said hook-like member and to receive adjacent the opposite end of said hanger the hook-like part of said member, means formed on said hanger and engageable with said hook-like part for limiting the movement of the hanger longitudinally of said arm, and spring means cooperating with said hanger and rigid element to oppose relative pivotal movement thereof.

JOHN W. ANDERSON.